US005545332A

United States Patent [19]
Koester et al.

[11] Patent Number: 5,545,332
[45] Date of Patent: Aug. 13, 1996

[54] PROCESS FOR DEWATERING FINE-PARTICLE SOLIDS SUSPENSIONS

[75] Inventors: Rita Koester, Duesseldorf; Gerhard Stoll, Korschenbroich; Peter Daute, Essen, all of Germany

[73] Assignee: Henkel Kommanditgesellschaft auf Aktien, Duesseldorf, Germany

[21] Appl. No.: 347,324

[22] PCT Filed: May 24, 1993

[86] PCT No.: PCT/EP93/01297

§ 371 Date: Dec. 1, 1994

§ 102(e) Date: Dec. 1, 1994

[87] PCT Pub. No.: WO93/24798

PCT Pub. Date: Dec. 9, 1993

[30] Foreign Application Priority Data

Jun. 1, 1992 [DE] Germany .......................... 42 18 050.3

[51] Int. Cl.[6] ................................ C02F 11/14; C02F 1/54

[52] U.S. Cl. .......................... 210/729; 210/732; 210/778; 209/5

[58] Field of Search .................................... 210/728, 729, 210/732, 778; 209/5

[56] References Cited

U.S. PATENT DOCUMENTS

| | | | |
|---|---|---|---|
| 2,266,954 | 12/1941 | Bonnet et al. | 210/42.5 |
| 4,925,587 | 5/1990 | Schenker et al. | 252/174.22 |
| 5,215,669 | 6/1993 | Koester et al. | 210/729 |

FOREIGN PATENT DOCUMENTS

| | | |
|---|---|---|
| 3723323 | 1/1989 | Germany . |
| 3918274 | 12/1990 | Germany . |
| 9119556 | 12/1991 | WIPO . |
| 9204092 | 3/1992 | WIPO . |

*Primary Examiner*—Neil McCarthy
*Attorney, Agent, or Firm*—Ernest G. Szoke; Wayne C. Jaeschke; Daniel S. Ortiz

[57] ABSTRACT

Finely divided solids suspensions can be dewatered by adding to the solids suspension a mixed hydroxy ether of the formula $$R^1-\overset{\displaystyle R^2 \atop |}{CH}-O-(CH_2CH_2))_nR^3$$

wherein $R^1$ is a linear hydroxy alkyl group containing from 2 to 16 carbon atoms with the hydroxyl group on the carbon atom adjacent to the carbon atom with the ether linkage and $R^2$ is a linear alkyl group with 1 to 15 carbon atoms with the proviso that the sum of the total carbon atoms in $R^1$ and $R^2$ is 5 to 17, $R^3$ is a linear or branched alkyl group with 1 to 12 carbon atoms and n is a number of from 1 to 20. The mixed hydroxy ethers are readily biodegradable, generate very little foam and have a low solidification point.

18 Claims, No Drawings

PROCESS FOR DEWATERING FINE-PARTICLE SOLIDS SUSPENSIONS

FIELD OF THE INVENTION

This invention relates to a process for dewatering fine-particle solids dispersions, in which internal hydroxy mixed ethers are used as auxiliaries.

BACKGROUND OF THE INVENTION

Large quantities of fine-particle solids of high water content accumulate in numerous branches of industry, for example in mining or in sewage treatment plants, and have to be dewatered before further processing or disposal as waste. For example, the dewatering of water-containing hard coal or coke is a central process in the preparation of coal-based fuels. It is often difficult to keep to the upper limits dictated by the market for the water content of these materials, for example because mined hard coal accumulates in very fine-particle form by virtue of the substantial mechanization of underground coal mining. At the present time, around 38% of mine-run coal consists of fine coal with particle diameters ranging from 0.5 to 10 mm; a further 14% consists of very fine coal with even smaller particle diameters.

RELATED ART

It is known that certain surfactants are suitable as auxiliaries for removing water from water-containing fine-particle solids suspensions, more particularly quartz sands or hard coals, so that the residual water content can be reduced. Surfactant-based dewatering aids of the type mentioned above, which have already been described include, for example, dialkyl sulfosuccinates [U.S. Pat. No. 2,266,954] and nonionic surfactants of the fatty alcohol polyglycol ether type [Erzmetall 30, 292 (1977)]. However, these surfactants are attended by the disadvantage that they foam to a considerable extent which gives rise to serious problems, particularly because the water is normally circulated in the preparation plants.

DE-A1-39 18 274 (Henkel) describes alkyl-terminated β-hydroxyalkyl ethers, so-called hydroxy mixed ethers, which are obtained by ring-opening of α-olefin epoxides with fatty alcohol ethoxylates and are used as low-foaming auxiliaries in the dewatering of solids suspensions. Although good results are obtained with these auxiliaries in the dewatering of solids, they have the disadvantage of unsatisfactory low-temperature behavior. Crystal formation can occur at temperatures of only 15° to 20° C., particularly where the auxiliaries are stored outside, with the result that the pumpability and flow behavior of the products deteriorate and their intended use is thus seriously impaired.

Accordingly, the problem addressed by the present invention was to provide hydroxy mixed ethers which would show improved low-temperature behavior for the same performance properties.

BRIEF DESCRIPTION OF THE INVENTION

The present invention relates to a process for dewatering fine-particle solids suspensions, in which internal hydroxy mixed ethers corresponding to formula (I)

$$R^1-\underset{|}{\overset{R^2}{C}}H-O-(CH_2CH_2O)_nR^3 \qquad (I)$$

in which $R^1$ represents a linear hydroxy alkyl group containing from 2 to 16 carbon atoms with the hydroxyl group bonded to the carbon atom adjacent to the carbon atom with the ether linkage; and $R^2$ represents a linear alkyl group containing 1 to 15 carbon atoms, with the proviso that the sum of the total number of carbon atoms in $R^1$ and $R^2$ is 5 to 17, $R^3$ is hydrogen or a linear or branched alkyl group containing 1 to 12 carbon atoms and n is a number of 1 to 20, are used as auxiliaries.

It has surprisingly been found that, by comparison with the known terminal hydroxy mixed ethers according to DE-A-39 18 274, the internal hydroxy mixed ethers to be used in accordance with the invention show distinctly better low-temperature behavior, more particularly lower solidification points, and equally good and, in some cases, even slightly improved performance properties.

DETAILED DESCRIPTION OF THE INVENTION

Internal hydroxy mixed ethers can be obtained similarly to terminal hydroxy mixed ethers by ring opening of internal olefin epoxides with fatty alcohol ethoxylates or glycols. Particulars of the synthesis can be found in DE-A1-37 23 323 (Henkel).

Internal hydroxy mixed ethers suitable for use in accordance with the present invention are ring opening products of internal olefin epoxides containing 6 to 18 carbon atoms with ethylene glycol, diethylene glycol and its higher homologs and adducts of, on average, 1 to 20 mol ethylene oxide (EO) with 1 mol of a linear or branched primary alcohol containing 1 to 12 carbon atoms. Typical examples are ring opening products of technical internal $C_{10-14}$ olefin epoxides with ethylene glycol, diethylene glycol, isopropyl alcohol-3EO, n-butanol-4EO, n-butanol-5EO, n-octanol-4EO and n-decanol-10EO. It has proved to be of particular advantage to use internal hydroxy mixed ethers corresponding to formula (I), in which the total number of carbon atoms in $R^1$ and $R^2$ is 9 to 13, $R^3$ is an alkyl radical containing 3 to 8 carbon atoms and n is a number of 1 to 10.

It is pointed out that technical internal olefins are always mixtures of various isomers, so that the internal hydroxy mixed ethers to be used in accordance with the invention also include technical mixtures of the various position isomers.

Commensurate with their use in accordance with the invention, the internal hydroxy mixed ethers corresponding to formula (I) must be dispersible in water. It is possible that dispersibility in water may not be satisfactory in cases where long-chain substituents $R^1$, $R^2$ and/or $R^3$ contrast with low values of the degree of ethoxylation n. However, the required dispersibility in water can readily be achieved by increasing the value for n within the limits mentioned above.

The internal hydroxy mixed ethers to be used in accordance with the invention may be used individually. However, it can be of advantage for dewatering certain solids to combine products differing in their chain length or their degree of ethoxylation with one another to utilize synergisms of their physicochemical properties. Similarly, it can be of advantage to use combinations of the internal hydroxy mixed ethers with other already known ionic or nonionic dewatering aids.

The internal hydroxy mixed ethers to be used in accordance with the invention support the dewatering of solids suspensions, are readily biodegradable and are distinguished by low solidification points. Accordingly, they are suitable for dewatering suspensions of various solids, such as for example iron ore concentrates, quartz sand, hard coal or coke. Another important application is the use of the internal hydroxy mixed ethers to be used in accordance with the invention as auxiliaries in the dewatering of solids suspensions accumulating in the recycling of wastepaper, for example in the deinking process or in the flotation of fillers.

In one advantageous embodiment of the process according to the invention, the internal hydroxy mixed ethers are used in quantities of 10 to 500 g, preferably in quantities of 100 to 400 g and more preferably in quantities of 150 to 250 g, based on the solids content, per tonne solids.

The following Examples are intended to illustrate the invention without limiting it in any way.

EXAMPLES

I. Hydroxy Mixed Ethers (HME) Used

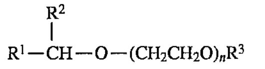

TABLE 1

| Composition and solidification point | | | | |
|---|---|---|---|---|
| HME | Number of carbon atoms in $R^1 + R^2$ | n | $R^3$ | Solidification point °C. |
| A | 12/13 | 7 | n-Butyl | −11 |
| B | 9/12 | 5 | n-Butyl | <−25 |
| C | 9/12 | 4 | i-Propyl | <−25 |
| D | 9/12 | 4 | n-Octanol | <−25 |
| E | 9/12 | 2 | n-Butyl | <−25 |
| F | 10/11 | 1 | Hydrogen | <−25 |
| G | 12/13 | 1 | Hydrogen | <−25 |
| Z | 13 | 7 | n-Butyl | +13 |

Hydroxy mixed ethers A to G correspond to the invention and were prepared from internal olefin epoxides. The chain length of the starting epoxide derives from the total number of carbon atoms ($R^1$+$R^2$+1). Since the olefins used are technical mixtures, the hydroxy mixed ethers according to the invention are also mixtures of the various position isomers.

Product Z is a terminal hydroxy mixed ether based on an $\alpha$-$C_{13/14}$ olefin epoxide according to DE-A1-39 18 274 and is intended for comparison.

II. Dewatering Tests in a Bucket Centrifuge

Quartz sand having the following particle size distribution was used for the dewatering tests:

| | |
|---|---|
| <125 μm | 2.8% by weight |
| 125 to 200 μm | 26.4% by weight |
| 200 to 315 μm | 60.1% by weight |
| >315 μm | 10.7% by weight |

The tests were carried out in a bucket centrifuge with which relative centrifugal forces of 15 to 2000 can be achieved. Perforated plates with sieve openings of 0.1×2 mm were used as the sieve lining. The dewatering aids were used in the form of aqueous solutions; all concentrations are based on the solids content of those solutions.

After the quartz sand had been weighed into the bucket of the centrifuge, the aqueous solutions of the dewatering aids were added and uniformly distributed. After a drainage time of 1 minute, the solid was dewatered for 30 s at a rotational speed of 500 r.p.m. The moist solids were then weighed out, dried to constant weight at 100° C. and the residual moisture content in %-rel was determined. All the test results are averages of double determinations. The results are summarized in Table 2.

TABLE 2

| Dewatering tests in a bucket centrifuge | | | |
|---|---|---|---|
| | | Residual moisture [% rel] | |
| Ex. | iHME | E = 150 g/t | E = 250 g/t |
| 1 | A | 5.4 | 4.3 |
| 2 | B | 5.2 | 4.6 |
| 3 | C | 4.9 | 4.2 |
| 4 | D | 6.2 | 5.3 |
| 5 | E | 5.0 | 4.5 |
| 6 | F | 4.8 | 4.5 |
| 7 | G | 5.0 | 4.7 |
| C1 | None | 7.4 | 7.2 |

Legend:
iHME = Internal hydroxy mixed ether
E = Quantity of i-hydroxy mixed ether in g weighed in per t solids

We claim:

1. A process for dewatering a fine-particle solids suspension, which comprises: adding to the suspension from 10 to 500 grams per metric ton of solid an internal hydroxy mixed ether of the formula

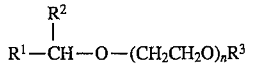
(I)

in which $R^1$ represents a linear hydroxy alkyl group containinq from 2 to 16 carbon atoms with the hydroxyl group bonded to the carbon atom adjacent to the carbon atom with the ether linkage and $R^2$ represents a linear alkyl group containing 1 to 15 carbon atoms, with the proviso that the sum of the total number of carbon atoms in $R^1$ and $R^2$ is 5 to 17, $R^3$ is hydrogen or a linear or branched alkyl group containing 1 to 12 carbon atoms and n is a number of 1 to 20, and separating water from the suspension.

2. The process as claimed in claim 1, wherein the sum of the number of carbon atoms in $R^1$ and $R^2$ is 9 to 13, $R^3$ is hydrogen or an alkyl group containing 3 to 8 carbon atoms and n is a number of 1 to 10.

3. The process as claimed in claim 1, wherein the suspension comprises at least one member selected from the group consisting of iron ore concentrate, quartz sand, coal and coke.

4. The process of claim 1 wherein the fine-particle solids suspension, is formed in a process for recycling wastepaper.

5. The process of claim 1 wherein $R^3$ is hydrogen.

6. The process of claim 2 wherein $R^3$ is hydrogen and n is a number of from 1 to 7.

7. The process of claim 2 wherein $R^3$ is an alkyl group containing from 3 to 8 carbon atoms and n is a number of from 1 to 7.

8. The process of claim 3 wherein the sum of the number of carbon atoms in $R^1$ and $R^2$ is 9 to 13, $R^3$ is hydrogen or an alkyl group containing 3 to 8 carbon atoms and n is a number of 1 to 10.

9. The process of claim 3 wherein $R^3$ is hydrogen.

10. The process of claim 3 wherein $R^3$ is hydrogen and n is a number of from 1 to 7.

11. The process of claim 3 wherein $R^3$ is hydrogen or an alkyl group containing from 3 to 8 carbon atoms and n is a number of from 1 to 7.

12. The process of claim 4 wherein the sum of the number of carbon atoms in $R^1$ and $R^2$ is 9 to 13, $R^3$ is hydrogen or an alkyl group containing 3 to 8 carbon atoms and n is a number of 1 to 10.

13. The process of claim 4 wherein $R^3$ is hydrogen.

14. The process of claim 4 wherein $R^3$ is hydrogen and n is a number of from 1 to 7.

15. The process of claim 4 wherein $R^3$ is hydrogen or an alkyl group containing from 3 to 8 carbon atoms and n is a number of from 1 to 7.

16. The process of claim 1 wherein the sum of the number of carbon atoms in $R^1$ and $R^2$ is from 12 to 13, $R^3$ is n-Butyl and n is 7.

17. The process of claim 1 wherein the sum of the number of carbon atoms in $R^1$ and $R^2$ is from 9 to 12, $R^3$ is an alkyl group containing from 3 to 8 carbon atoms and n is from 2 to 5.

18. The process of claim 1 wherein the sum of the carbon atoms in $R^1$ and $R^2$ is from 10 to 13, $R^3$ is hydrogen and n is 1.

* * * * *